US011554635B2

(12) United States Patent
Kinoshita et al.

(10) Patent No.: US 11,554,635 B2
(45) Date of Patent: Jan. 17, 2023

(54) HEAT MANAGEMENT DEVICE

(71) Applicants: TOYOTA JIDOSHA KABUSHIKI KAISHA, Toyota (JP); SUBARU CORPORATION, Tokyo (JP)

(72) Inventors: Kohji Kinoshita, Nagoya (JP); Shoma Hanano, Toyota (JP); Yoshio Hasegawa, Toyota (JP); Manabu Orihashi, Okazaki (JP); Kenichi Kubota, Toyota (JP); Hideyuki Kawai, Toyota (JP); Makoto Ikegami, Obu (JP); Yuuki Kimura, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 173 days.

(21) Appl. No.: 17/182,931

(22) Filed: Feb. 23, 2021

(65) Prior Publication Data

US 2021/0291628 A1    Sep. 23, 2021

(30) Foreign Application Priority Data

Mar. 19, 2020    (JP) .................................. 2020-050148

(51) Int. Cl.
*B60H 1/00*    (2006.01)
(52) U.S. Cl.
CPC ..... *B60H 1/00885* (2013.01); *B60H 1/00899* (2013.01)

(58) Field of Classification Search
CPC ............. H01M 10/613; H01M 10/615; H01M 10/625; H01M 10/633; H01M 10/635;
(Continued)

(56) References Cited

U.S. PATENT DOCUMENTS 8,720,538 B2 *   5/2014   Hiyama ............. B60H 1/00492
                                                       165/10
9,561,704 B2 *   2/2017   Enomoto ............... B60K 11/02
(Continued)

FOREIGN PATENT DOCUMENTS

CN        104470747 B  *  8/2017   ......... B60H 1/00278
JP        2014000948 A  *  1/2014   ......... B60H 1/00278
(Continued)

*Primary Examiner* — Ljiljana V. Ciric
(74) *Attorney, Agent, or Firm* — Oliff PLC

(57) ABSTRACT

A heat circuit may include a controller configured to execute a first process and then a defrosting operation. The first process may be a process to execute a first air-heating operation and a heat storage operation simultaneously. The second process may be a process to execute a defrosting operation. The controller may be configured, in the first air-heating operation, to cause the radiator to heat a radiator passage and cause the air-heating apparatus to heat air using heat of a air-heating passage while circulating the heat medium in the radiator passage and the air-heating passage. The controller may be configured, in the heat storage operation, to circulate the heat medium in an electrical apparatus passage and a bypass passage. The controller may be configured, in the defrosting operation, to circulate the heat medium in the electrical apparatus passage and the radiator passage.

7 Claims, 10 Drawing Sheets

(58) Field of Classification Search
CPC ......... H01M 10/6568; H01M 10/6571; H01M 10/659; B60K 2001/005; B60K 2001/008; B60K 1/00; B60H 1/00885; B60H 1/00899; B60H 2001/00928; B60H 1/00385; B60H 1/32284; B60H 2001/00307; B60H 1/00278; B60L 58/26; B60L 58/27

See application file for complete search history.

(56) References Cited

U.S. PATENT DOCUMENTS

| | | | | |
|---|---|---|---|---|
| 10,371,419 | B2 * | 8/2019 | Enomoto | B60H 1/00899 |
| 10,457,117 | B2 * | 10/2019 | Enomoto | B60H 1/24 |
| 10,465,952 | B2 * | 11/2019 | He | F25B 47/022 |
| 10,737,552 | B2 * | 8/2020 | He | F25B 41/20 |
| 11,127,993 | B2 * | 9/2021 | King | H01M 10/63 |
| 2013/0240185 | A1 * | 9/2013 | Katoh | F28D 1/0426 |
| | | | | 165/140 |
| 2019/0078497 | A1 | 3/2019 | Enomoto et al. | |
| 2021/0291628 | A1 * | 9/2021 | Kinoshita | B60H 1/00385 |
| 2022/0115719 | A1 * | 4/2022 | King | H01M 10/63 |

FOREIGN PATENT DOCUMENTS

| | | | | |
|---|---|---|---|---|
| JP | 6060797 B2 * | 1/2017 | | B60H 1/00278 |
| JP | 2017-150352 A | 8/2017 | | |
| WO | WO-2013175739 A1 * | 11/2013 | | B60H 1/00278 |
| WO | WO-2020089551 A1 * | 5/2020 | | B60H 1/00492 |

* cited by examiner

HEAT MANAGEMENT DEVICE

CROSS-REFERENCE TO RELATED APPLICATION(S)

This application claims priority to Japanese Patent Application No. 2020-050148 filed on Mar. 19, 2020, the contents of which are hereby incorporated by reference into the present application.

TECHNICAL FIELD

The technology disclosed herein relates to a heat management device.

BACKGROUND

Japanese Patent Application Publication No. 2017-150352 describes a heat management device to be mounted on a vehicle. The heat management device includes a plurality of heat circuits (a heater circuit, an engine circuit, and the like) in which heat media respectively circulate. The heat management device can execute an air-heating operation and an air-cooling operation by heat exchange with the heat media.

SUMMARY

Some heat management devices may execute an air-heating operation by causing a radiator to heat a heat medium in a heat circuit and using the heated heat medium as a heat source. In the heat management devices of this type, the low-temperature heat medium flows into the radiator and is heated in the radiator by heat exchange with outside air. In this case, the radiator is cooled by the heat medium. When the radiator is cooled, a surface of the radiator may be frosted. If the radiator is frosted during the air-heating operation, heat-exchange efficiency of the radiator is degraded. The present disclosure therefore proposes a heat management device that can execute a defrosting operation to remove frost on a radiator.

A heat management device disclosed herein may be configured to be mounted on a vehicle. The heat management device may comprise: a heat circuit in which a heat medium circulates, the heat circuit comprising a radiator passage, a bypass passage, an electrical apparatus passage, and an air-heating passage connected with each other; a radiator configured to exchange heat between the heat medium in the radiator passage and outside air; electrical apparatus configured to be cooled by the electrical apparatus passage; air-heating apparatus configured to heat air in a cabin of the vehicle; at least one control valve configured to change a channel in the heat circuit in which the heat medium flows; and a controller. The controller may be configured to execute a first process and then a second process. The first process may be a process to execute a first air-heating operation and a heat storage operation simultaneously. The second process may be a process to execute a defrosting operation. The controller may be configured, in the first air-heating operation, to cause the radiator to heat the heat medium in the radiator passage and cause the air-heating apparatus to heat the air in the cabin of the vehicle using heat of the heat medium in the air-heating passage while circulating the heat medium in a first circulation channel including the radiator passage and the air-heating passage by controlling the at least one control valve. The controller may be configured, in the heat storage operation, to circulate the heat medium in a second circulation channel including the electrical apparatus passage and the bypass passage by controlling the at least one control valve. The controller may be configured, in the defrosting operation, to circulate the heat medium in a third circulation channel including the electrical apparatus passage and the radiator passage by controlling the at least one control valve.

The second process may be executed successively after the first process, or another process may be executed after the first process and then the second process may be executed.

The radiator passage, the bypass passage, the electrical apparatus passage, and the air-heating passage may be connected directly with each other or may be connected with each other via another passage.

In the heat management device, in the first air-heating operation in the first process, the heat medium circulates in the first circulation channel including the radiator passage and the air-heating passage. In the first air-heating operation, the heat medium in the radiator passage is heated by the radiator, by which the high-temperature heat medium heated by the radiator flows into the air-heating passage. The air-heating apparatus is configured to heat the air in the cabin of the vehicle using the heat of the high-temperature heat medium in the air-heating passage. In the air-heating passage, the heat of the heat medium is provided to the air-heating apparatus, by which the heat medium is cooled. The low-temperature heat medium cooled in the air-heating passage therefore flows into the radiator. When the radiator is cooled by the low-temperature heat medium, the radiator may be frosted. In the first process, the first air-heating operation and the heat storage operation are executed simultaneously. In the heat storage operation, the heat medium circulates in the second circulation channel including the electrical apparatus passage and the bypass passage. In the electrical apparatus passage, the electrical apparatus is cooled and the heat medium is heated by heat exchange between the electrical apparatus and the heat medium. In the heat storage operation, therefore, the temperature of the heat medium in the second circulation channel rises as time elapses. After the first process, the second process (i.e., the defrosting operation) is executed. In the defrosting operation, the heat medium circulates in the third circulation channel including the electrical apparatus passage and the radiator passage. The heat medium in the electrical apparatus passage has been heated in the heat storage operation in the first process, thus the high-temperature heat medium in the electrical apparatus passage flows into the radiator passage in the defrosting operation. In the defrosting operation, the radiator is thus heated by the high-temperature heat medium. This allows frost on the radiator to evaporate and thereby be removed. As such, executing the defrosting operation can remove frost from the radiator. Thus, after the defrosting operation, the radiator can be used with high heat-exchange efficiency.

DETAILED DESCRIPTION

Technological elements of a heat management device disclosed herein will be listed below. The technological elements below are independently useful.

In an aspect of the heat management device disclosed herein, the controller may be configured to execute the first process and the second process alternately.

According to this configuration, the first air-heating operation can be executed repetitively with high efficiency. The first process may be executed successively after the first process, or another process may be executed after the second process, and then the first process may be executed.

In an aspect of the heat management device disclosed herein, the heat management device may further comprise a heat emitter. The second process may be a process to execute the defrosting operation and a second air-heating operation simultaneously. The controller may be configured, in the second air-heating operation, to cause the air-heating apparatus to heat the air in the cabin of the vehicle using the heat emitter as a heat source.

According to this configuration, the first air-heating operation is executed in the first process and the second air-heating operation is executed in the second process, by which the air-heating operation can be executed continuously.

In an aspect of the heat management device disclosed herein, the heat emitter may include a battery configured to provide power to a motor configured to drive the vehicle.

According to this configuration, the second air-heating operation can be executed using waste heat generated by the battery.

In an aspect of the heat management device disclosed herein, the heat emitter may include a heater.

In an aspect of the heat management device disclosed herein, the heat managing device may further comprise a heat pump and an air-heating heat circuit in which a heat medium circulates. The heat pump may comprise: a first heat exchanger configured to absorb heat from the heat medium in the air-heating passage; and a second heat exchanger configured to transfer heat to the heat medium in the air-heating heat circuit. The air-heating apparatus may be configured to heat the air in the cabin of the vehicle by exchanging heat between the heat medium in the air-heating heat circuit and the air in the cabin of the vehicle in the first air-heating operation.

According to this configuration, the first air-heating operation can be executed with higher efficiency by a combination of the heat pump and the air-heating apparatus.

In an aspect of the heat management device disclosed herein, the first circulation channel may be separated from the second circulation channel.

According to this configuration, the heat medium in the first circulation channel can be prevented from mixing with the heat medium in the second circulation channel. The first air-heating operation can thereby be executed with high efficiency.

Figure 1:
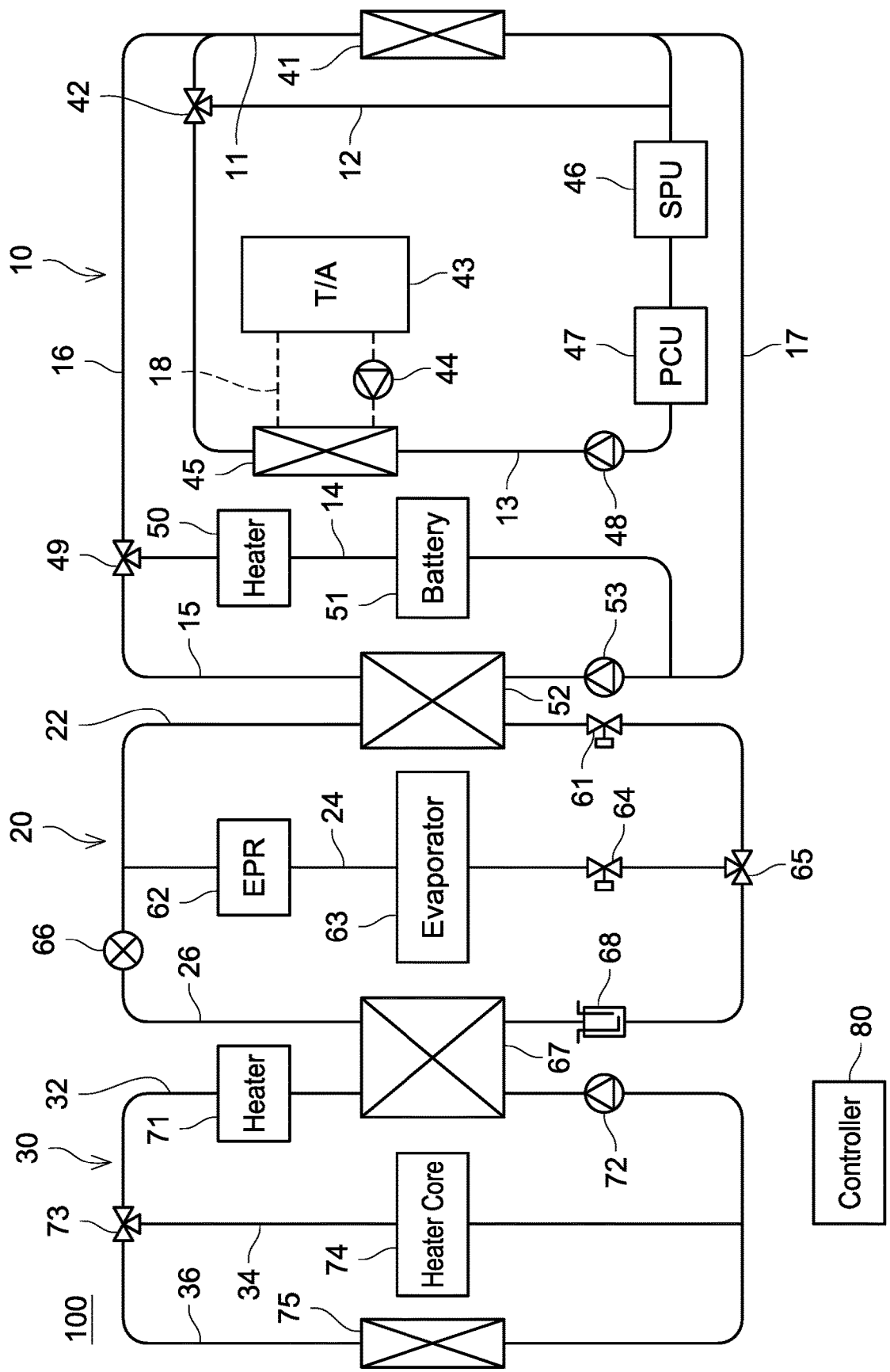
FIG. 1 is a circuit diagram of a heat management device according to an embodiment.

A heat management device 100 according to an embodiment shown in FIG. 1 includes a first heat circuit 10, a second heat circuit 20, and a third heat circuit 30. Heat media respectively flow in the first heat circuit 10, the second heat circuit 20, and the third heat circuit 30. Respective channels of the first heat circuit 10, the second heat circuit 20, and the third heat circuit 30 in which the heat media flow are independent from each other. The respective heat media in the first heat circuit 10, the second heat circuit 20, and the third heat circuit 30 may be constituted of the same material or different materials. Hydrofluorocarbons can be used as the heat media, for example. The heat management device 100 is configured to be mounted on a vehicle. The heat management device 100 can execute an air-cooling operation of cooling air in a vehicle cabin by using an evaporator 63. Moreover, the heat management device 100 can execute an air-heating operation of heating the air in the vehicle cabin by using a heater core 74. The heat management device 100 can cool a battery 51, a transaxle 43, a power control unit (PCU) 47, and a smart power unit (SPU) 46.

The first heat circuit 10 includes a low-temperature radiator passage 11, a bypass passage 12, an electrical apparatus passage 13, a battery passage 14, a chiller passage 15, a connection passage 16, and a connection passage 17.

A low-temperature radiator 41 is disposed in the low-temperature radiator passage 11. The low-temperature radiator 41 is configured to exchange heat between the heat medium in the low-temperature radiator passage 11 and outside air (i.e., air outside the vehicle). In a case where a temperature of the outside air is lower than the temperature of the heat medium in the low-temperature radiator passage 11, the heat medium in the low-temperature radiator passage 11 is cooled by the low-temperature radiator 41. In a case where the temperature of the outside air is higher than the temperature of the heat medium in the low-temperature radiator passage 11, the heat medium in the low-temperature radiator passage 11 is heated by the low-temperature radiator 41.

A downstream end of the electrical apparatus passage 13 is connected to an upstream end of the bypass passage 12 and an upstream end of the low-temperature radiator passage 11 via a three-way valve 42. An upstream end of the electrical apparatus passage 13 is connected to a downstream end of the bypass passage 12 and a downstream end of the low-temperature radiator passage 11. A pump 48 is disposed in the electrical apparatus passage 13. The pump 48 pumps the heat medium in the electrical apparatus passage 13 downstream. The three-way valve 42 is configured to switch channels to switch states between a state where the heat medium flows from the electrical apparatus passage 13 to the low-temperature radiator passage 11 and a state where the heat medium flows from the electrical apparatus passage 13 to the bypass passage 12. When the pump 48 operates while the three-way valve 42 is controlled so that the heat medium flows from the electrical apparatus passage 13 to the low-temperature radiator passage 11, the heat medium circulates in a circulation channel configured with the electrical apparatus passage 13 and the low-temperature radiator passage 11. When the pump 48 operates while the three-way valve 42 is controlled so that the heat medium flows from the electrical apparatus passage 13 to the bypass passage 12, the heat medium circulates in a circulation channel configured with the electrical apparatus passage 13 and the bypass passage 12.

The SPU 46, the PCU 47, and an oil cooler 45 are disposed in the electrical apparatus passage 13. The SPU 46 and the PCU 47 are disposed upstream of the pump 48, and the oil cooler 45 is disposed downstream of the pump 48. The SPU 46 and the PCU 47 are configured to be cooled by heat exchange with the heat medium in the electrical apparatus passage 13. The oil cooler 45 is a heat exchanger. An oil-circulation path 18 is connected to the oil cooler 45. The oil cooler 45 cools oil in the oil-circulation path 18 by heat exchange between the heat medium in the electrical apparatus passage 13 and the oil in the oil-circulation path 18. The oil-circulation path 18 is disposed to pass through the transaxle 43. The transaxle 43 has a motor built therein. The motor built in the transaxle 43 is a traction motor configured to rotate a drive wheel of the vehicle. A part of the oil-circulation path 18 is configured with a sliding portion (i.e., a bearing) of the motor. In other words, the oil in the oil-circulation path 18 is lubricating oil for an inside of the motor. An oil pump 44 is disposed in the oil-circulation path 18. The oil pump 44 circulates the oil in the oil-circulation path 18. When the oil cooled by the oil cooler 45 circulates in the oil-circulation path 18, the motor built in the transaxle 43 is cooled. The SPU 46 controls charging and discharging of the battery 51. The PCU 47 converts DC power provided from the battery 51 into AC power and provides the AC power to the motor built in the transaxle 43.

A downstream end of the chiller passage 15 is connected to an upstream end of the battery passage 14 and an upstream end of the connection passage 16 via a three-way valve 49. An upstream end of the chiller passage 15 is connected to a downstream end of the battery passage 14 and a downstream end of the connection passage 17. The connection passage 17 has an upstream end connected to a downstream end of the connection passage 16 by the low-temperature radiator passage 11. A pump 53 is disposed in the chiller passage 15. The pump 53 pumps the heat medium in the chiller passage 15 downstream. The three-way valve 49 is configured to switch channels to switch states between a state where the heat medium flows from the chiller passage 15 to the battery passage 14 and a state where the heat medium flows from the chiller passage 15 to the connection passage 16. When the pump 53 operates while the three-way valve 49 is controlled so that the heat medium flows from the chiller passage 15 to the battery passage 14, the heat medium circulates in a circulation channel configured with the chiller passage 15 and the battery passage 14. When the pump 53 operates while the three-way valve 49 is controlled so that the heat medium flows from the chiller passage 15 to the connection passage 16, the heat medium circulates in a circulation channel configured with the chiller passage 15, the connection passage 16, the low-temperature radiator passage 11, and the connection passage 17.

A chiller 52 is disposed in the chiller passage 15. The chiller 52 is disposed downstream of the pump 53. The chiller 52 is configured to cool the heat medium in the chiller passage 15 by heat exchange between the heat medium in the chiller passage 15 and the heat medium in the second heat circuit 20 (more specifically, in a chiller passage 22 described below).

A heater 50 and the battery 51 are disposed in the battery passage 14. The battery 51 is configured to provide DC power to the PCU 47. In other words, the battery 51 is configured to provide power via the PCU 47 to the motor built in the transaxle 43. The battery 51 is configured to be cooled by heat exchange with the heat medium in the battery passage 14. The heater 50 is disposed upstream of the battery 51. The heater 50 is an electric heater and heats the heat medium in the battery passage 14.

The second heat circuit 20 includes the chiller passage 22, an evaporator passage 24, and a condenser passage 26. A downstream end of the condenser passage 26 is connected to an upstream end of the chiller passage 22 and an upstream end of the evaporator passage 24 via a three-way valve 65. An upstream end of the condenser passage 26 is connected to a downstream end of the chiller passage 22 and a downstream end of the evaporator passage 24. A compressor 66 is disposed in the condenser passage 26. The compressor 66 supplies the heat medium in the condenser passage 26 downstream while compressing the heat medium. The three-way valve 65 switches channels to switch states between a state where the heat medium flows from the condenser passage 26 to the chiller passage 22 and a state where the heat medium flows from the condenser passage 26 to the evaporator passage 24. When the compressor 66 operates while the three-way valve 65 is controlled so that the heat medium flows from the condenser passage 26 to the chiller passage 22, the heat medium circulates in a circulation channel configured with the condenser passage 26 and the chiller passage 22. When the compressor 66 operates while the three-way valve 65 is controlled so that the heat medium flows from the condenser passage 26 to the evaporator passage 24, the heat medium circulates in a circulation channel configured with the condenser passage 26 and the evaporator passage 24.

A condenser 67 and a modulator 68 are disposed in the condenser passage 26. The condenser 67 is disposed downstream of the compressor 66, and the modulator 68 is disposed downstream of the condenser 67. The heat medium supplied by the compressor 66 is a high-temperature gas. The heat medium which is a high-temperature gas thus flows into the condenser 67. The condenser 67 is configured to cool the heat medium in the condenser passage 26 by heat exchange between the heat medium in the condenser passage 26 and the heat medium in the third heat circuit 30 (more specifically, in a condenser passage 32 described below). The heat medium in the condenser passage 26 condenses by being cooled in the condenser 67. The heat medium that has passed through the condenser 67 is therefore a low-temperature liquid. The heat medium which is a low-temperature liquid therefore flows into the modulator 68. The modulator 68 removes air bubbles from the heat medium which is a liquid.

An expansion valve 61 and the chiller 52 are disposed in the chiller passage 22. The chiller 52 is disposed downstream of the expansion valve 61. The heat medium that has passed through the modulator 68 (i.e., the heat medium that is a low-temperature liquid) flow into the expansion valve 61. The heat medium is decompressed as passing through the expansion valve 61. The heat medium that is a low-pressure and low-temperature liquid therefore flows into the chiller 52. The chiller 52 heats the heat medium in the chiller passage 22 and cools the heat medium in the chiller passage 15 by heat exchange between the heat medium in the chiller passage 22 and the heat medium in the chiller passage 15. In the chiller 52, the heat medium in the chiller passage 22 is heated to thereby evaporate. The heat medium in the chiller passage 22 thus efficiently absorbs heat from the heat medium in the chiller passage 15. The heat medium in the chiller passage 15 is thereby cooled efficiently. The heat medium in the chiller passage 22 that has passed through the chiller 52 (i.e., the heat medium that is a high-temperature gas) is compressed by the compressor 66 and transferred to the condenser 67.

An expansion valve 64, the evaporator 63, and an evaporator pressure regulator (EPR) 62 are disposed in the evaporator passage 24. The evaporator 63 is installed downstream of the expansion valve 64, and the EPR 62 is installed downstream of the evaporator 63. The heat medium that has passed through the modulator 68 (i.e., the heat medium that is a low-temperature liquid) flows into the expansion valve 64. The heat medium is decompressed when passing through the expansion valve 64. The heat medium that is a low-pressure and low-temperature liquid therefore flows into the evaporator 63. The evaporator 63 heats the heat medium and cools the air in the vehicle cabin by heat exchange between the heat medium in the evaporator passage 24 and the air in the vehicle cabin. In other words, the evaporator 63 executes air-cooling in the vehicle cabin. In the evaporator 63, the heat medium is heated by heat exchange to thereby evaporate. The heat medium thus efficiently absorbs heat from the air in the vehicle cabin. The air in the vehicle cabin is thereby cooled efficiently. The EPR 62 controls the flow rate of the heat medium in the evaporator passage 24 so that the pressure in the evaporator 63 remains approximately constant. The heat medium that has passed through the EPR 62 (i.e., the heat medium that is a high-temperature gas) is compressed by the compressor 66 and transferred to the condenser 67.

The third heat circuit 30 includes the condenser passage 32, a heater core passage 34, and a high-temperature radiator passage 36. A downstream end of the condenser passage 32 is connected to an upstream end of the heater core passage 34 and an upstream end of the high-temperature radiator passage 36 via a three-way valve 73. An upstream end of the condenser passage 32 is connected to a downstream end of the heater core passage 34 and a downstream end of the high-temperature radiator passage 36. A pump 72 is disposed in the condenser passage 32. The pump 72 pumps the heat medium in the condenser passage 32 downstream. The three-way valve 73 switches channels to switch states between a state where the heat medium flows from the condenser passage 32 to the heater core passage 34 and a state where the heat medium flows from the condenser passage 32 to the high-temperature radiator passage 36. When the pump 72 operates while the three-way valve 73 is controlled so that the heat medium flows from the condenser passage 32 to the heater core passage 34, the heat medium circulates in a circulation channel configured with the condenser passage 32 and the heater core passage 34. When the pump 72 operates while the three-way valve 73 is controlled so that the heat medium flows from the condenser passage 32 to the high-temperature radiator passage 36, the heat medium circulates in a circulation channel configured with the condenser passage 32 and the high-temperature radiator passage 36.

The condenser 67 and a heater 71 are disposed in the condenser passage 32. The condenser 67 is disposed downstream of the pump 72, and the heater 71 is disposed downstream of the condenser 67. The condenser 67 heats the heat medium in the condenser passage 32 and cools the heat medium in the condenser passage 26 by heat exchange between the heat medium in the condenser passage 32 and the heat medium in the condenser passage 26. The heater 71 is an electric heater and heats the heat medium in the condenser passage 32.

The heater core 74 is disposed in the heater core passage 34. The heater core 74 is configured to heat the air in the vehicle cabin by heat exchange between the heat medium in the heater core passage 34 and the air in the vehicle cabin. In other words, the heater core 74 executes air-heating in the vehicle cabin.

A high-temperature radiator 75 is disposed in the high-temperature radiator passage 36. The high-temperature radiator 75 cools the heat medium in the high-temperature radiator passage 36 by heat exchange between the heat medium in the high-temperature radiator passage 36 and the outside air.

The heat management device 100 includes a controller 80. The controller 80 is configured to control each part of the heat management device 100.

Figure 2:
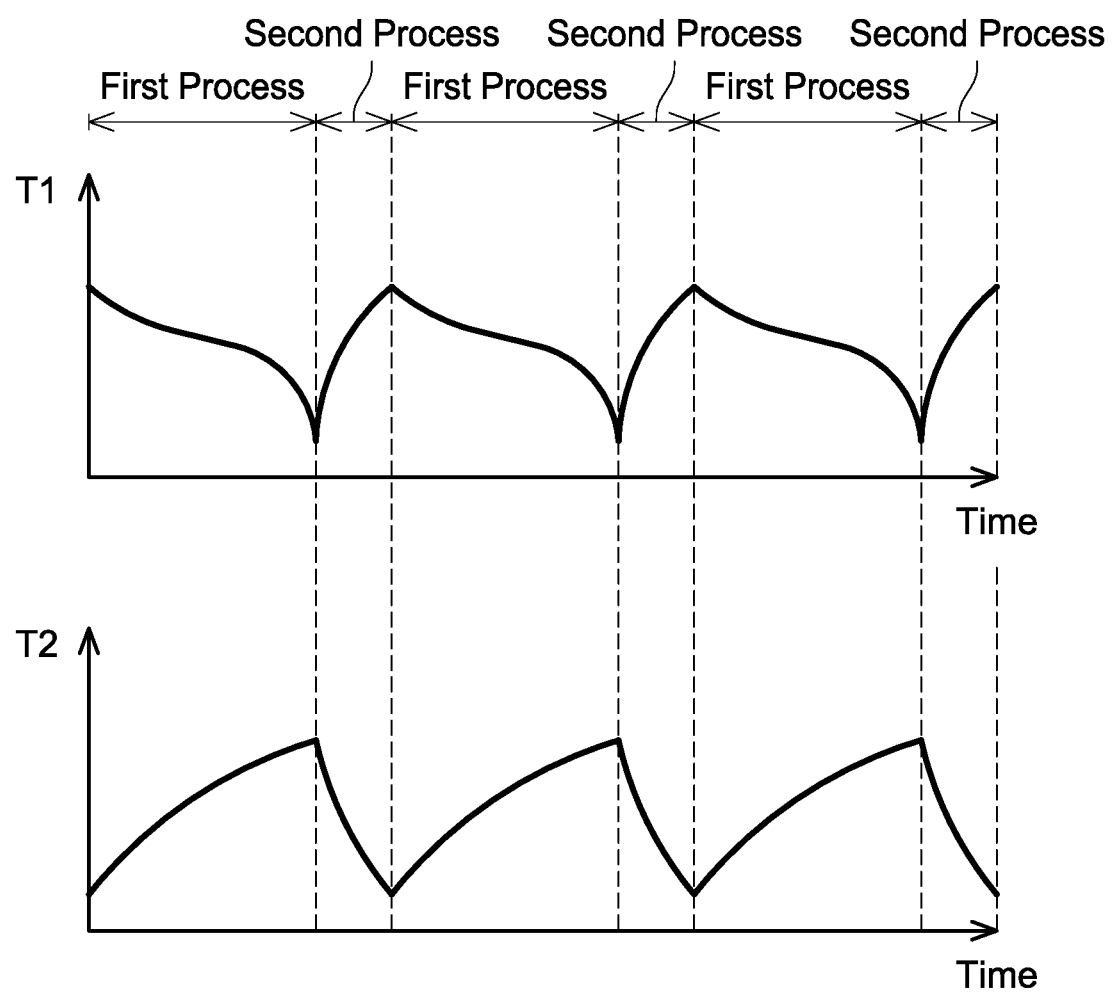
FIG. 2 is a graph showing changes in temperatures T1, T2 of a heat medium in a first process and a second process.

(Defrosting and Air-Heating Operation) The controller 80 can execute a defrosting and air-heating operation. In the defrosting and air-heating operation, the controller 80 executes a first process and a second process alternately as shown in FIG. 2. A temperature T1 in FIG. 2 indicates a temperature of the heat medium at an outlet of the low-temperature radiator 41, and a temperature T2 in FIG. 2 indicates a temperature of the heat medium in the electrical apparatus passage 13. In the first process, the controller 80 executes a first air-heating operation and a heat storage operation simultaneously. In the second process, the controller 80 executes a defrosting operation and a second air-heating operation simultaneously. The first process and the second process will be described below.

Figure 3:
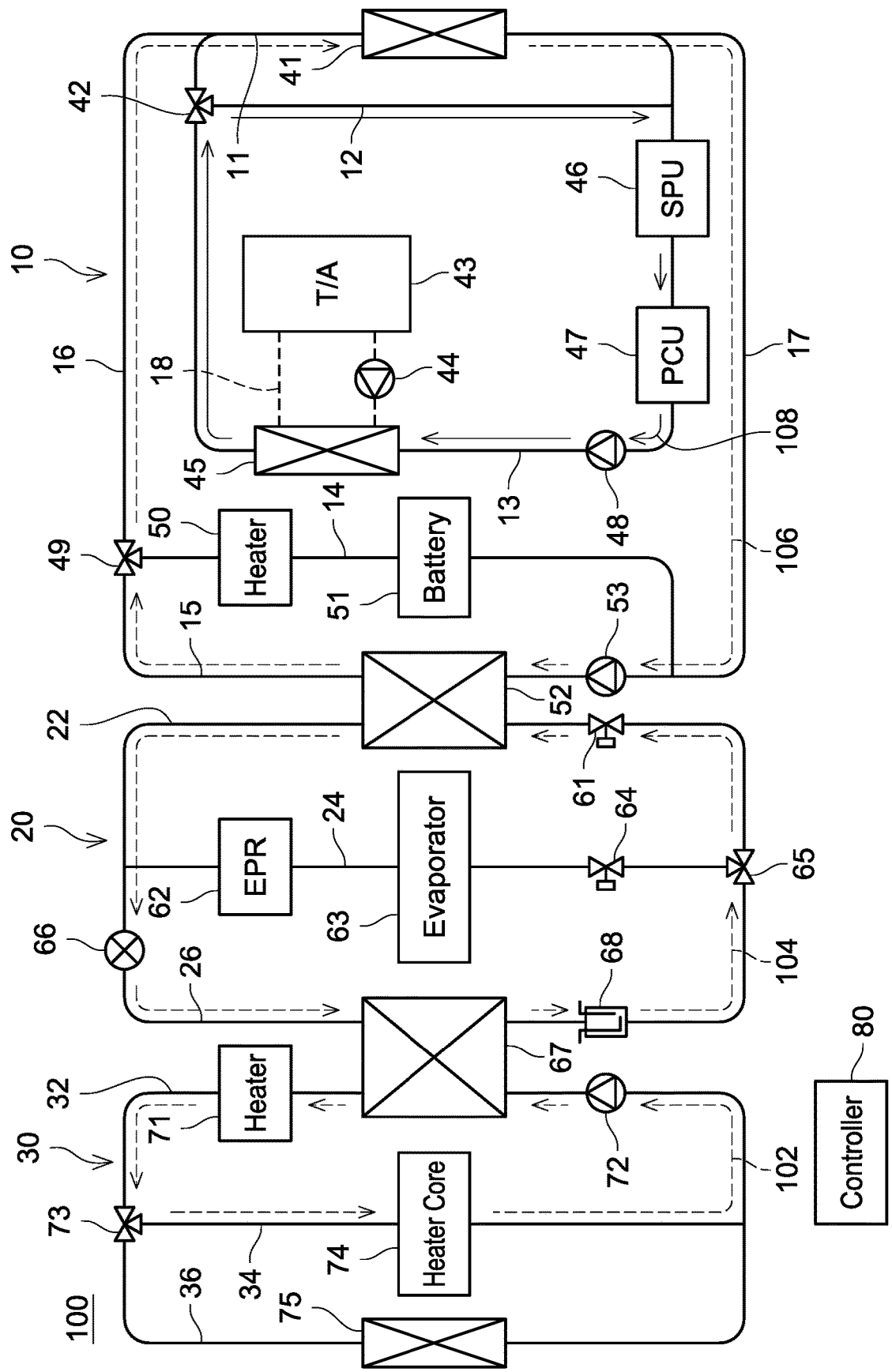
FIG. 3 is a circuit diagram showing the first process.

In the first process, the controller 80 controls each part of the heat management device 100 as shown in FIG. 3. As described above, the controller 80 executes the first air-heating operation and the heat storage operation simultaneously in the first process. In FIG. 3, circulation channels 102, 104, 106 are circulation channels involved in the first air-heating operation, and a circulation channel 108 is a circulation channel involved in the heat storage operation.

The first air-heating operation will be described. In the third heat circuit 30, the three-way valve 73 is controlled so that the heat medium flows from the condenser passage 32 to the heater core passage 34, and the pump 72 operates. The heat medium therefore circulates in the circulation channel 102 configured with the condenser passage 32 and the heater core passage 34. In the second heat circuit 20, the three-way valve 65 is controlled so that the heat medium flows from the condenser passage 26 to the chiller passage 22, and the compressor 66 operates. The heat medium therefore circulates in the circulation channel 104 configured with the condenser passage 26 and the chiller passage 22. In the first heat circuit 10, the three-way valve 49 is controlled so that the heat medium flows from the chiller passage 15 to the connection passage 16, and the pump 53 operates. The heat medium therefore circulates in the circulation channel 106 configured with the chiller passage 15, the connection passage 16, the low-temperature radiator passage 11, and the connection passage 17.

In the circulation channel 106, the low-temperature heat medium cooled by the chiller 52 flows into the low-temperature radiator 41. The temperature of the heat medium that flows into the low-temperature radiator 41 is therefore lower than the temperature of the outside air. The heat medium is thus heated in the low-temperature radiator 41. Consequently, the high-temperature heat medium heated by the low-temperature radiator 41 flows into the chiller 52. In the chiller 52, the heat medium in the chiller passage 15 (i.e., the circulation channel 106) is cooled and the heat medium in the chiller passage 22 (i.e., the circulation channel 104) is heated. In the circulation channel 104, therefore, the high-temperature heat medium heated by the chiller 52 flows into the condenser 67. In the condenser 67, the heat medium in the condenser passage 26 (i.e., the circulation channel 104) is cooled and the heat medium in the condenser passage 32 (i.e., the circulation channel 102) is heated. In the circulation channel 102, therefore, the high-temperature heat medium heated by the condenser 67 flows into the heater core 74. The heater core 74 heats the air in the vehicle cabin by heat exchange between the heat medium in the heater core passage 34 and the air in the vehicle cabin. The air heated by the heater core 74 is blown by a fan (not shown). As described above, the first air-heating operation is executed and the vehicle cabin is heated. As is clear from the description above, heat is provided to the heater core 74 via the heat medium in the chiller passage 15 in the first air-heating operation. In other words, in the first air-heating operation, the heater core 74 heats the air in the cabin of the vehicle using heat of the heat medium in the chiller passage 15. In other words, in the first air-heating operation, the heater core 74 is supplied with heat from the heat medium in the chiller passage 15 to heat the air in the cabin of the vehicle.

As described above, the heat medium cooled by the chiller 52 flows into the low-temperature radiator 41 in the first air-heating operation. The low-temperature radiator 41 is thus cooled by the low-temperature heat medium. Consequently, the low-temperature radiator 41 may be frosted during the first air-heating operation. Particularly when the outside air is high and humid, the low-temperature radiator 41 is easily frosted. Frost on the low-temperature radiator 41 accumulates during the first air-heating operation. The accumulation of frost on the low-temperature radiator 41 decreases heat-exchange efficiency of the low-temperature radiator 41, by which it becomes difficult to heat the heat medium in the low-temperature radiator 41. Consequently, as shown in FIG. 2, the temperature T1 of the heat medium at the outlet of the low-temperature radiator 41 gradually decreases during the first process. As such, when the low-temperature radiator 41 is frosted, efficiency of the low-temperature radiator 41 in heating the heat medium decreases, which decreases air-heating efficiency.

Next, the heat storage operation will be described. In the first heat circuit 10, the three-way valve 42 is controlled so that the heat medium flows from the electrical apparatus passage 13 to the bypass passage 12, and the pump 48 operates. The heat medium therefore circulates in the circulation channel 108 configured with the electrical apparatus passage 13 and the bypass passage 12. In the heat storage operation, the oil pump 44 operates and the oil in the oil-circulation path 18 circulates.

The SPU 46, the PCU 47, and the motor built in the transaxle 43 generate heat while operating. The heat medium flowing in the circulation channel 108 (i.e., the electrical apparatus passage 13) cools the SPU 46 and the PCU 47. The oil cooler 45 cools the oil in the oil-circulation path 18 with the heat medium in the electrical apparatus passage 13. Consequently, the cooled oil is provided to the motor built in the transaxle 43, and the motor is cooled. As described above, electrical apparatuses (i.e., the SPU 46, the PCU 47, and the motor) are cooled in the heat storage operation. The heat medium in the circulation channel 108 is heated by the SPU 46, the PCU 47, and the oil cooler 45 in the heat storage operation. The circulation channel 108 includes no device to cool the heat medium in the circulation channel 108. Due to this, as shown in FIG. 2, the temperature T2 of the heat medium in the electrical apparatus passage 13 thus gradually rises during the first process.

Figure 4:
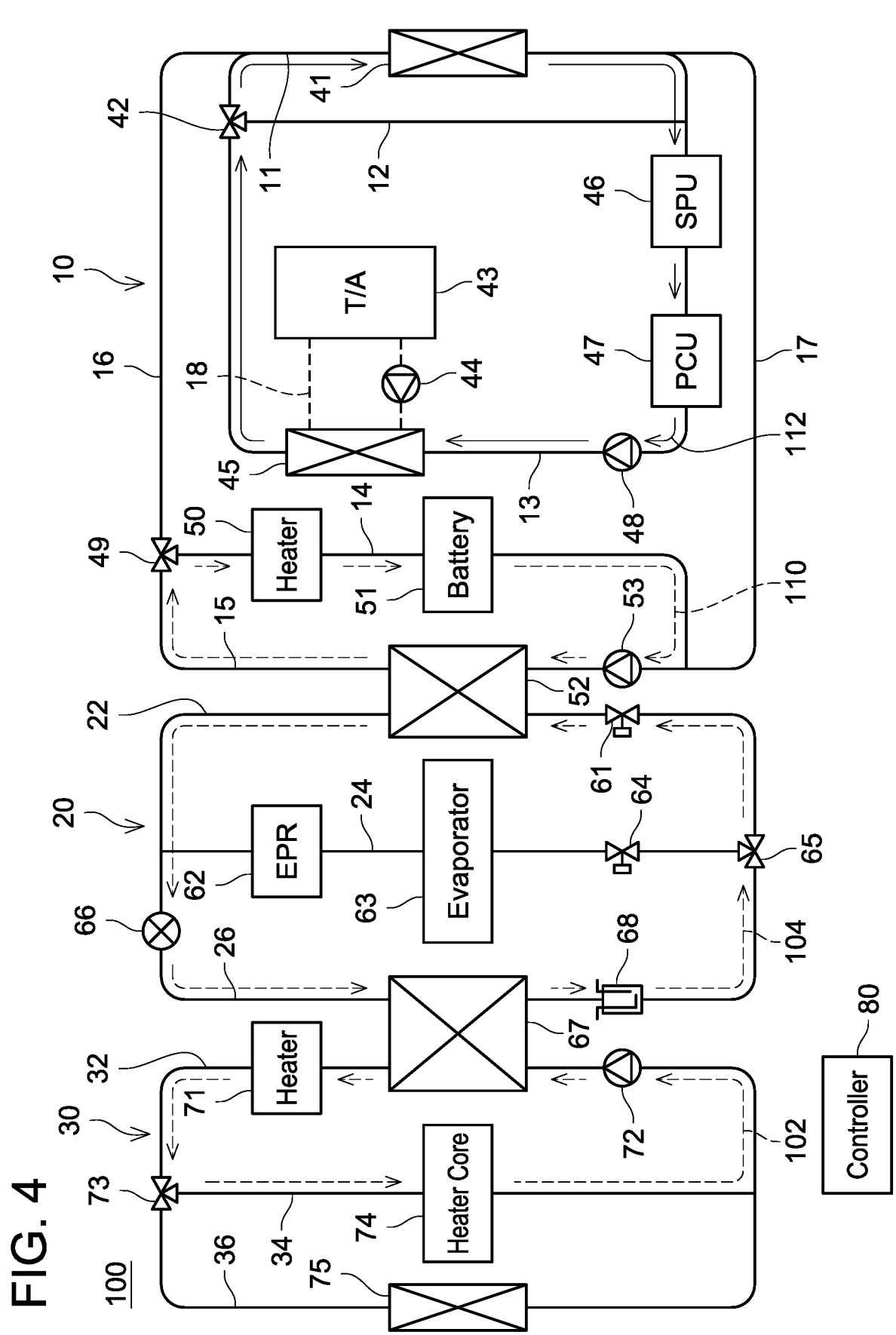
FIG. 4 is a circuit diagram showing the second process (in a case of executing a second air-heating operation using a battery as a heat source).

After the first process, the second process is executed. In the second process, the controller 80 controls each part of the heat management device 100 as shown in FIG. 4. As described above, the controller 80 executes the second air-heating operation and the defrosting operation simultaneously in the second process. In FIG. 4, the circulation channels 102, 104 and a circulation channel 110 are circulation channels involved in the second air-heating operation, and a circulation channel 112 is a circulation channel involved in the defrosting operation.

The second air-heating operation will be described. In the third heat circuit 30, the heat medium circulates in the circulation channel 102 as in the first air-heating operation. In the second heat circuit 20, the heat medium circulates in the circulation channel 104 as in the first air-heating operation. In the first heat circuit 10, the three-way valve 49 is controlled so that the heat medium flows from the chiller passage 15 to the battery passage 14, and the pump 53 operates. The heat medium therefore circulates in the circulation channel 110 configured with the chiller passage 15 and the battery passage 14.

The battery 51 generates heat when being charged and discharging. In the circulation channel 110, the heat medium in the battery passage 14 exchanges heat with the battery 51. The battery 51 is thereby cooled and the heat medium in the battery passage 14 is thereby heated. The high-temperature heat medium heated by the battery 51 therefore flows into the chiller 52. Heat is therefore provided to the heater core 74 also in the second air-heating operation, as in the first air-heating operation. In other words, in the chiller 52, the heat medium in the chiller passage 15 (i.e., the circulation channel 110) is cooled and the heat medium in the chiller passage 22 (i.e., the circulation channel 104) is heated. In the condenser 67, the heat medium in the condenser passage 26 (i.e., the circulation channel 104) is cooled and the heat medium in the condenser passage 32 (i.e., the circulation channel 102) is heated. The heater core 74 heats the air in the vehicle cabin by heat exchange between the heat medium in the circulation channel 102 and the air in the vehicle cabin. As described above, the second air-heating operation is executed and air in the vehicle cabin is heated. As is clear from the description above, the heater core 74 heats the air in the vehicle cabin using the battery 51 as a heat source in the second air-heating operation.

Next, the defrosting operation will be described. In the first heat circuit 10, the three-way valve 42 is controlled so that the heat medium flows from the electrical apparatus passage 13 to the low-temperature radiator passage 11, and the pump 48 operates. The heat medium therefore circulates in the circulation channel 112 configured with the electrical apparatus passage 13 and the low-temperature radiator passage 11. In the defrosting operation, the oil pump 44 operates and the oil in the oil-circulation path 18 circulates.

As described above, the heat medium in the electrical apparatus passage 13 reaches a high temperature during the heat storage operation. In the defrosting operation, the three-way valve 42 is switched, and the high-temperature heat medium in the electrical apparatus passage 13 flows into the low-temperature radiator passage 11 (i.e., the low-temperature radiator 41). Due to this, as shown in FIG. 2, the temperature T1 of the heat medium at the outlet of the low-temperature radiator 41 sharply rises during the second process. The temperature of the heat medium that flows into the low-temperature radiator 41 is higher than respective temperatures of the low-temperature radiator 41 and the outside air. In the low-temperature radiator 41, therefore, the low-temperature radiator 41 is heated and the heat medium is cooled by heat exchange between the low-temperature radiator 41 and the heat medium. Since the heat medium is cooled by the low-temperature radiator 41, the temperature T2 of the heat medium in the electrical apparatus passage 13 decreases as shown in FIG. 2 during the second process. In the defrosting operation, since the low-temperature radiator 41 is heated, the frost on the low-temperature radiator 41 evaporates, resulting in removal of the frost from the low-temperature radiator 41. This restores a heat-exchange efficiency of the low-temperature radiator 41. Thus, in the first air-heating operation in the first process executed after the second process, the air in the vehicle cabin is heated with high efficiency.

As described above, in the defrosting and air-heating operation, the heat medium in the electrical apparatus passage 13 reaches a high temperature by simultaneous execution of the heat storage operation and the first air-heating operation in the first process. In the second process after the first process, the high-temperature heat medium in the electrical apparatus passage 13 is supplied to the low-temperature radiator 41, by which frost is removed from the low-temperature radiator 41. This restores the heat-exchange efficiency of the low-temperature radiator 41, by which the air in the vehicle cabin can be heated with high efficiency in the first process executed afterwards (i.e., the first air-heating operation). Moreover, in the second process, the second air-heating operation using the battery 51 as a heat source is executed simultaneously with the defrosting operation. Thus, the air in the vehicle cabin is continuously heated from the first process to the second process. Because of repetitive execution of the first process and the second process as in FIG. 2, the air in the vehicle cabin can be continuously heated with high efficiency.

The second heat circuit 20 configures a heat pump. In the first air-heating operation, the second heat circuit 20 causes the chiller 52 to absorb heat from the chiller passage 15 and causes the condenser 67 to diffuse heat to the condenser passage 32. As such, heat is transferred from the chiller passage 15 to the condenser passage 32 via the second heat circuit 20 serving as a heat pump, by which the heat medium in the condenser passage 32 can be heated with high efficiency to a temperature higher than the temperature of the heat medium in the chiller passage 15. In the first air-heating operation, therefore, the air in the cabin of the vehicle can be heated efficiently. The second heat circuit 20 serving as a heat pump is used also in the second air-heating operation, by which the air in the cabin of the vehicle can be heated efficiently.

As shown in FIG. 3, in the first process, the circulation channel 106 and the circulation channel 108 are separated, and hence the heat medium in the circulation channel 106 does not mix with the heat medium in the circulation channel 108. Because of this, in the first air-heating operation, the low-temperature heat medium is supplied to the low-temperature radiator 41, by which the heat medium can be heated efficiently. Moreover, in the heat storage operation, the temperature of the heat medium in the circulation channel 108 can be raised to a high temperature. Thus, in the defrosting operation, the high-temperature heat medium can be supplied to the low-temperature radiator 41, by which frost can be removed from the low-temperature radiator 41 effectively.

Figure 5:
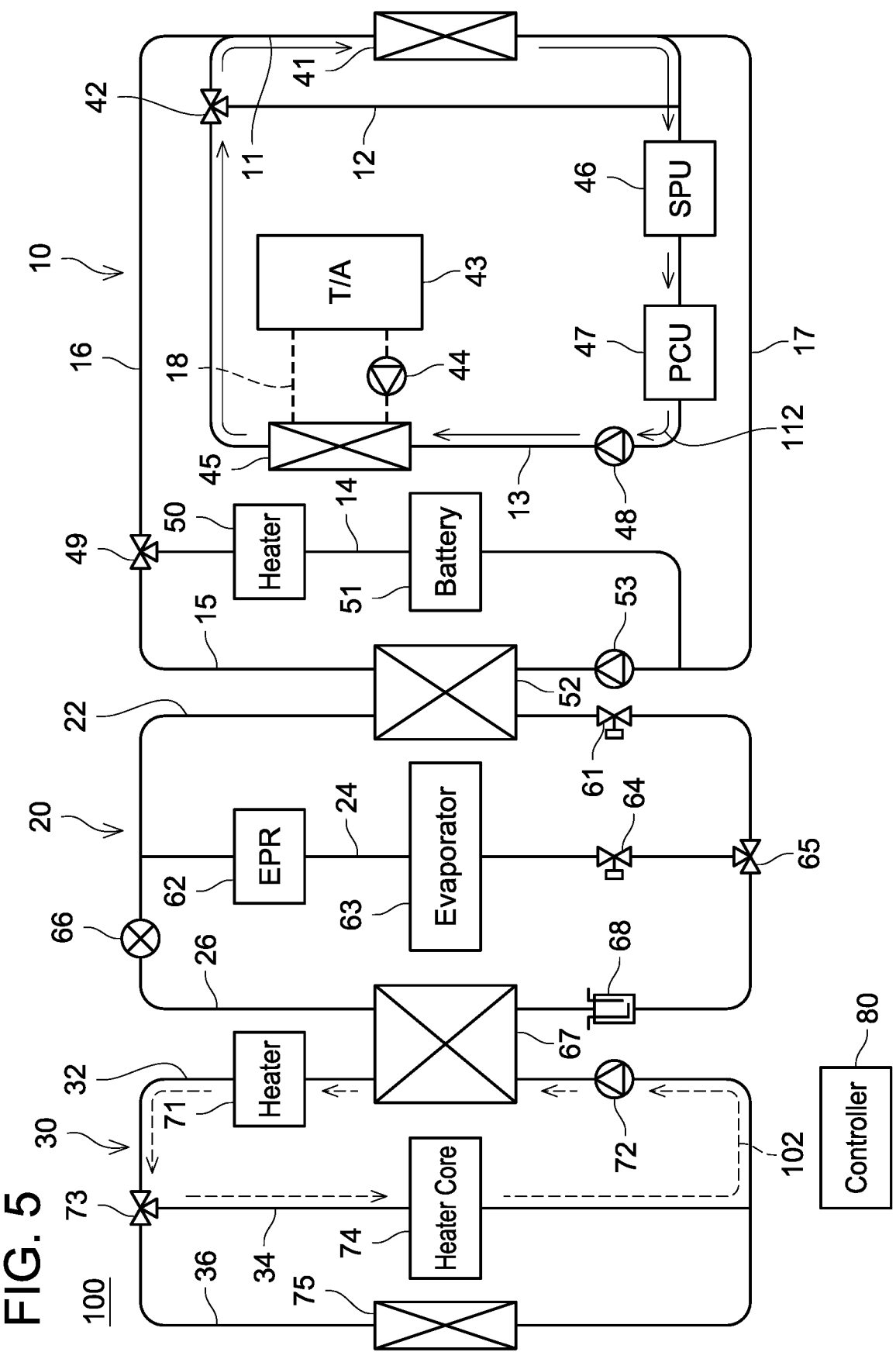
FIG. 5 is a circuit diagram showing the second process (in a case of executing the second air-heating operation using a heater as a heat source).

In the second process in FIG. 4, the second air-heating operation is executed using the battery 51 as a heat source. It should be noted that since the temperature of the battery 51 varies depending on a state of the vehicle, the temperature of the battery 51 may not be high enough to heat the heat medium. Because of this, in a case where the temperature of the battery 51 is lower than a reference value, the second process may be executed as shown in FIG. 5. In FIG. 5, the defrosting operation is executed as in FIG. 4. In FIG. 5, the circulation channel 102 is a circulation channel involved in the second air-heating operation.

In the second air-heating operation in FIG. 5, the three-way valve 73 in the third heat circuit 30 is controlled so that the heat medium flows from the condenser passage 32 to the heater core passage 34, and the pump 72 operates. The heat medium therefore circulates in the circulation channel 102 configured with the condenser passage 32 and the heater core passage 34. The second heat circuit 20 and the first heat circuit 10 are not involved in the second air-heating operation in FIG. 5. In the second air-heating operation in FIG. 5, the controller 80 operates the heater 71.

In the circulation channel 102 in FIG. 5, the heat medium in the condenser passage 32 is heated by the heater 71. The high-temperature heat medium heated by the heater 71 therefore flows into the heater core passage 34. The heater core 74 heats the air in the vehicle cabin by heat exchange between the heat medium in the heater core passage 34 and the air in the vehicle cabin. The air heated by the heater core 74 is blown by a fan (not shown). As described above, the second air-heating operation is executed and the air in the vehicle cabin is heated. As is clear from the description above, the heater core 74 heats the air in the vehicle cabin using the heater 71 as a heat source in the second air-heating operation in FIG. 5.

As such, selectively executing the second process in FIG. 4 and the second process in FIG. 5 in accordance with the temperature of the battery 51 enables execution of the second air-heating operation even when the temperature of the battery 51 is low. In another embodiment, the heat source in the second air-heating operation may always be the heater 71. The heat source in the second air-heating operation is not limited to the battery 51 or the heater 71, but may be another device. For example, when the vehicle is a hybrid vehicle, the heat source of the second air-heating operation may be an engine.

Although the second process is executed successively after the first process in FIG. 2, another process may be executed temporarily after the first process and then the second process may be executed. Moreover, although the first process is executed successively after the second process in FIG. 2, another process may be executed temporarily after the second process and then the first process may be executed. Moreover, although the first process is executed successively after the second process in FIG. 2, another process of exchanging heat in the low-temperature radiator 41 may be executed after the second process. Such configurations also allow removal of frost from the low-temperature radiator 41 in the second process, by which efficient heat exchange can be achieved in the low-temperature radiator 41 in the successive processes.

The heat management device 100 is configured to execute various operations other than the defrosting and air-heating operation. For example, when there is no risk of frost forming on the low-temperature radiator 41, the controller 80 can continuously execute the first air-heating operation. Moreover, the controller 80 can continuously execute the second air-heating operation. Moreover, the controller 80 can execute, for example, an air-cooling operation, a battery-cooling operation, and an electrical apparatus-cooling operation, which will be described below.

Figure 6:
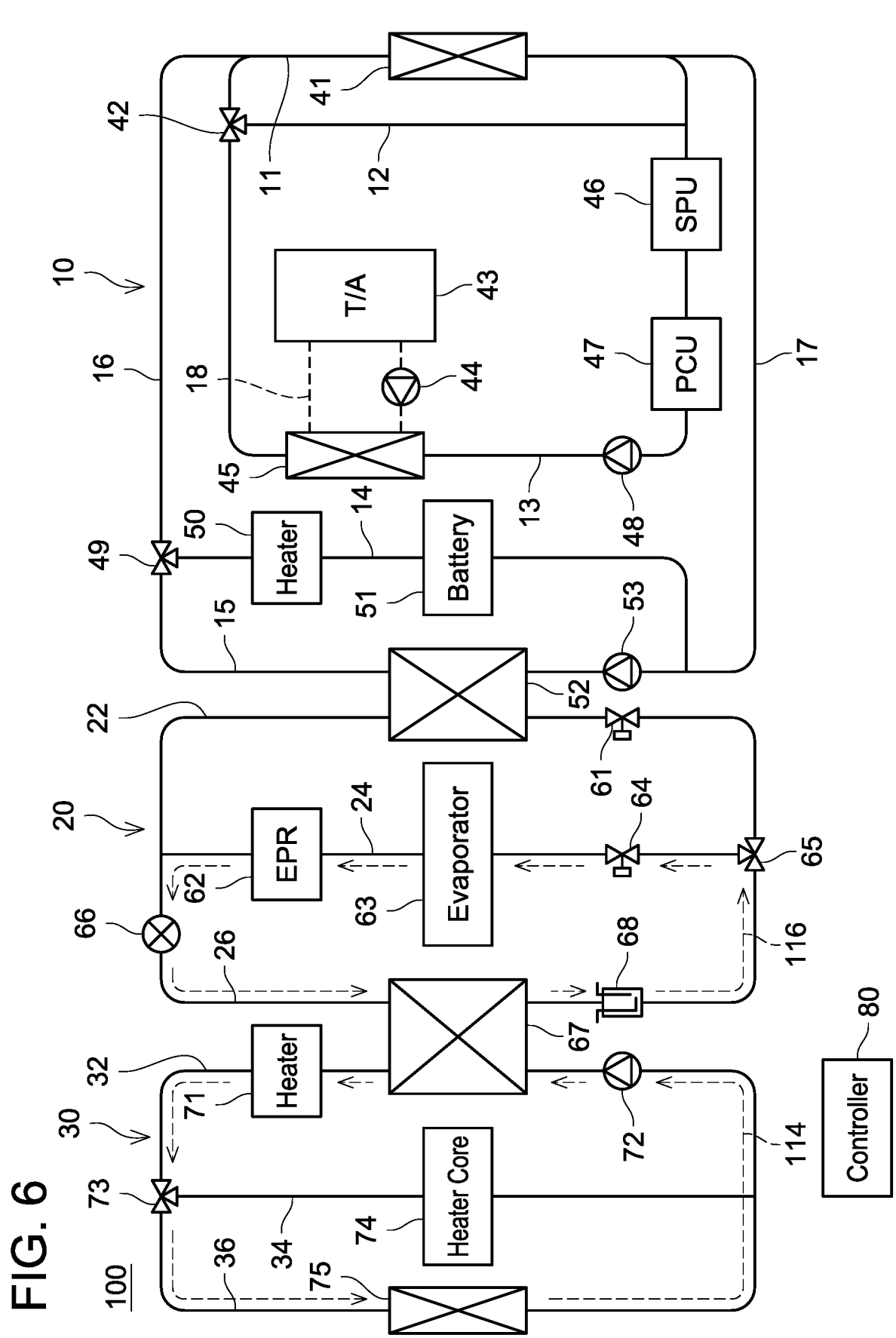
FIG. 6 is a circuit diagram showing an air-cooling operation.

(Air-Cooling Operation) In the air-cooling operation, the controller 80 controls each part of the heat management device 100 as shown in FIG. 6. In the third heat circuit 30, the three-way valve 73 is controlled so that the heat medium flows from the condenser passage 32 to the high-temperature radiator passage 36, and the pump 72 operates. The heat medium therefore circulates in a circulation channel 114 configured with the condenser passage 32 and the high-temperature radiator passage 36. In the second heat circuit 20, the three-way valve 65 is controlled so that the heat medium flows from the condenser passage 26 to the evaporator passage 24, and the compressor 66 operates. The heat medium therefore circulates in a circulation channel 116 configured with the condenser passage 26 and the evaporator passage 24. The first heat circuit 10 is not involved in the air-cooling operation.

In the circulation channel 114 in FIG. 6, the high-temperature heat medium heated by the condenser 67 flows into the high-temperature radiator 75. The temperature of the heat medium that flows into the high-temperature radiator 75 is therefore higher than the temperature of the outside air. The heat medium is thus cooled in the high-temperature radiator 75. Consequently, the low-temperature heat medium cooled by the high-temperature radiator 75 flows into the condenser 67. In the condenser 67, the heat medium in the condenser passage 32 (i.e., the circulation channel 114) is heated and the heat medium in the condenser passage 26 (i.e., the circulation channel 116) is cooled. Thus, in the circulation channel 116, the low-temperature heat medium cooled by the condenser 67 flows into the evaporator 63. The evaporator 63 cools the air in the vehicle cabin by heat exchange between the heat medium in the circulation channel 116 and the air in the vehicle cabin. The air cooled by the evaporator 63 is blown by a fan (not shown). As described above, the operation of cooling the air in the vehicle cabin is executed.

Figure 7:
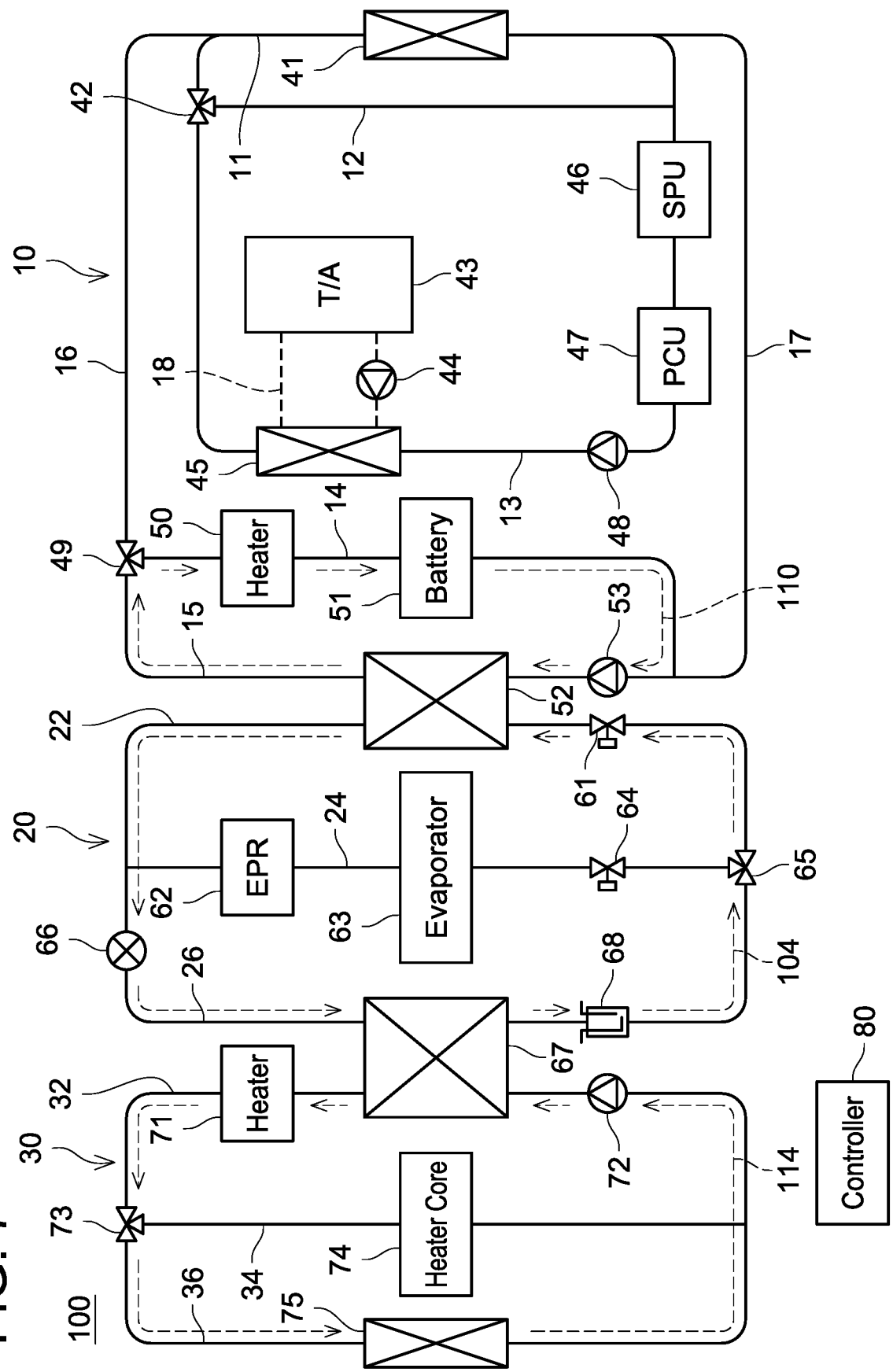
FIG. 7 is a circuit diagram showing a battery-cooling operation.

(Battery-Cooling Operation) The battery-cooling operation is executed when the temperature of the battery 51 rises to a temperature equal to or higher than a reference value. In the battery-cooling operation, the controller 80 controls each part of the heat management device 100 as shown in FIG. 7. In the third heat circuit 30, the three-way valve 73 and the pump 72 are controlled so that the heat medium circulates in the circulation channel 114 configured with the condenser passage 32 and the high-temperature radiator passage 36. In the second heat circuit 20, the three-way valve 65 and the compressor 66 are controlled so that the heat medium circulates in the circulation channel 104 configured with the condenser passage 26 and the chiller passage 22. In the first heat circuit 10, the three-way valve 49 and the pump 53 are controlled so that the heat medium circulates in the circulation channel 110 configured with the chiller passage 15 and the battery passage 14.

The circulation channel 114 in FIG. 7 operates as in FIG. 6 (i.e., in the air-cooling operation). The heat medium in the condenser passage 26 (i.e., the circulation channel 104) is therefore cooled by the condenser 67. In the circulation channel 104, therefore, the low-temperature heat medium cooled by the condenser 67 flows into the chiller 52. In the chiller 52, the heat medium in the chiller passage 22 (i.e., the circulation channel 104) is heated and the heat medium in the chiller passage 15 (i.e., the circulation channel 110) is cooled. In the circulation channel 110, therefore, the low-temperature heat medium cooled by the chiller 52 flows into the battery passage 14, by which the battery 51 is cooled. As described above, the operation of cooling the battery 51 is executed.

When the temperature of the battery 51 rises to a temperature equal to or higher than the reference value, the second air-heating operation in FIG. 4 may be executed in place of the battery-cooling operation. The battery 51 can be cooled in the second air-heating operation in FIG. 4 as well.

Figure 8:
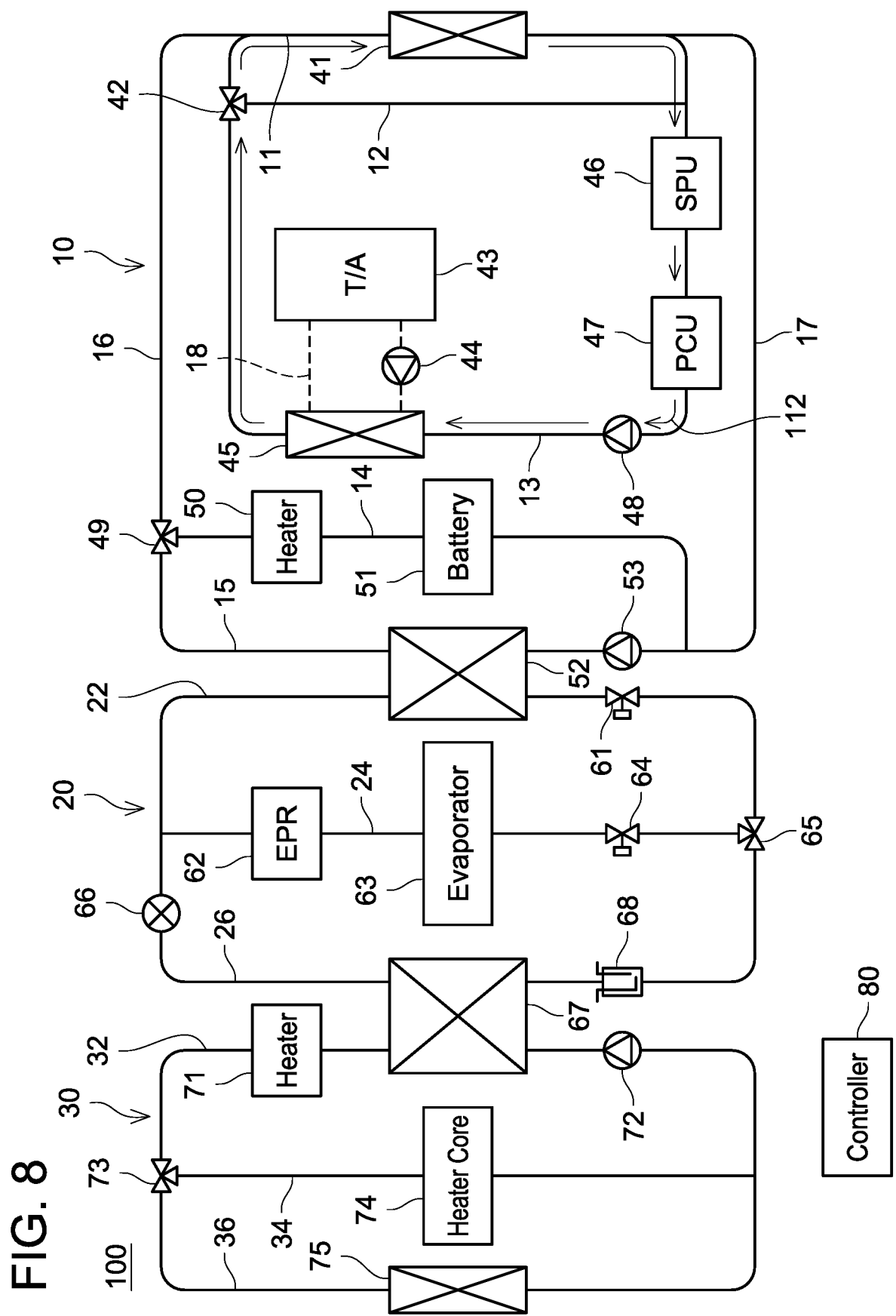
FIG. 8 is a circuit diagram showing an electrical apparatus-cooling operation.

(Electrical Apparatus-Cooling Operation) The electrical apparatus-cooling operation is executed while the SPU 46, the PCU 47, and the motor built in the transaxle 43 operate. The electrical apparatus-cooling operation may be executed when the temperature of at least one of the SPU 46, the PCU 47, or the motor exceeds a reference value. In the electrical apparatus-cooling operation, the controller 80 controls each part of the heat management device 100 as shown in FIG. 8. Neither the third heat circuit 30 nor the second heat circuit 20 is involved in the electrical apparatus-cooling operation. In the first heat circuit 10, the three-way valve 42 and the pump 48 are controlled so that the heat medium circulates in the circulation channel 112 configured with the electrical apparatus passage 13 and the low-temperature radiator passage 11. In the electrical apparatus-cooling operation, the oil pump 44 operates and the oil in the oil-circulation path 18 circulates.

In the circulation channel 112, the high-temperature heat medium heated by the SPU 46, the PCU 47, and the oil cooler 45 flows into the low-temperature radiator 41. The temperature of the heat medium that flows into the low-temperature radiator 41 is therefore higher than the temperature of the outside air. The heat medium in the low-temperature radiator passage 11 (i.e., the circulation channel 112) is thus cooled by the low-temperature radiator 41. In the circulation channel 112, therefore, the low-temperature heat medium cooled by the low-temperature radiator 41 flows into the electrical apparatus passage 13, by which the SPU 46 and the PCU 47 are cooled. The oil cooler 45 cools the oil in the oil-circulation path 18 with the low-temperature heat medium. Consequently, the cooled oil is provided to the motor built in the transaxle 43, by which the motor is cooled. As described above, the electrical apparatus-cooling operation to cool the electrical apparatus (i.e., the SPU 46, the PCU 47, and the motor) is executed.

The controller 80 can also execute operation(s) other than the above-mentioned operations. For example, the controller 80 can execute an operation to heat the battery 51 by causing the heater 50 to heat the heat medium while circulating the heat medium in the circulation channel 110. This operation is executed in a case where the battery 51 reaches an excessively low temperature in a cold climate area, for example.

Figure 9:
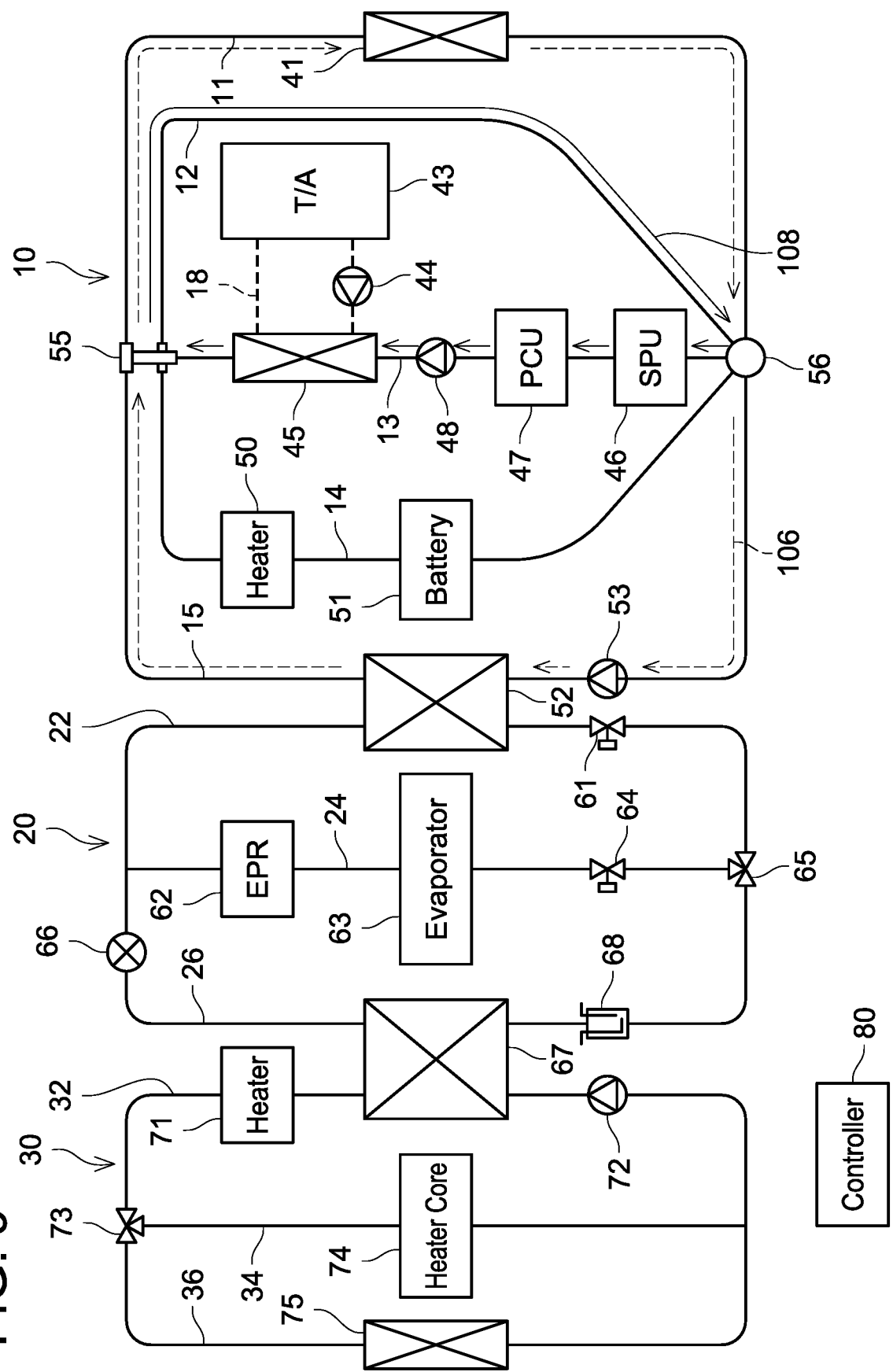
FIG. 9 is a circuit diagram of a heat management device of a variant.
Figure 10:
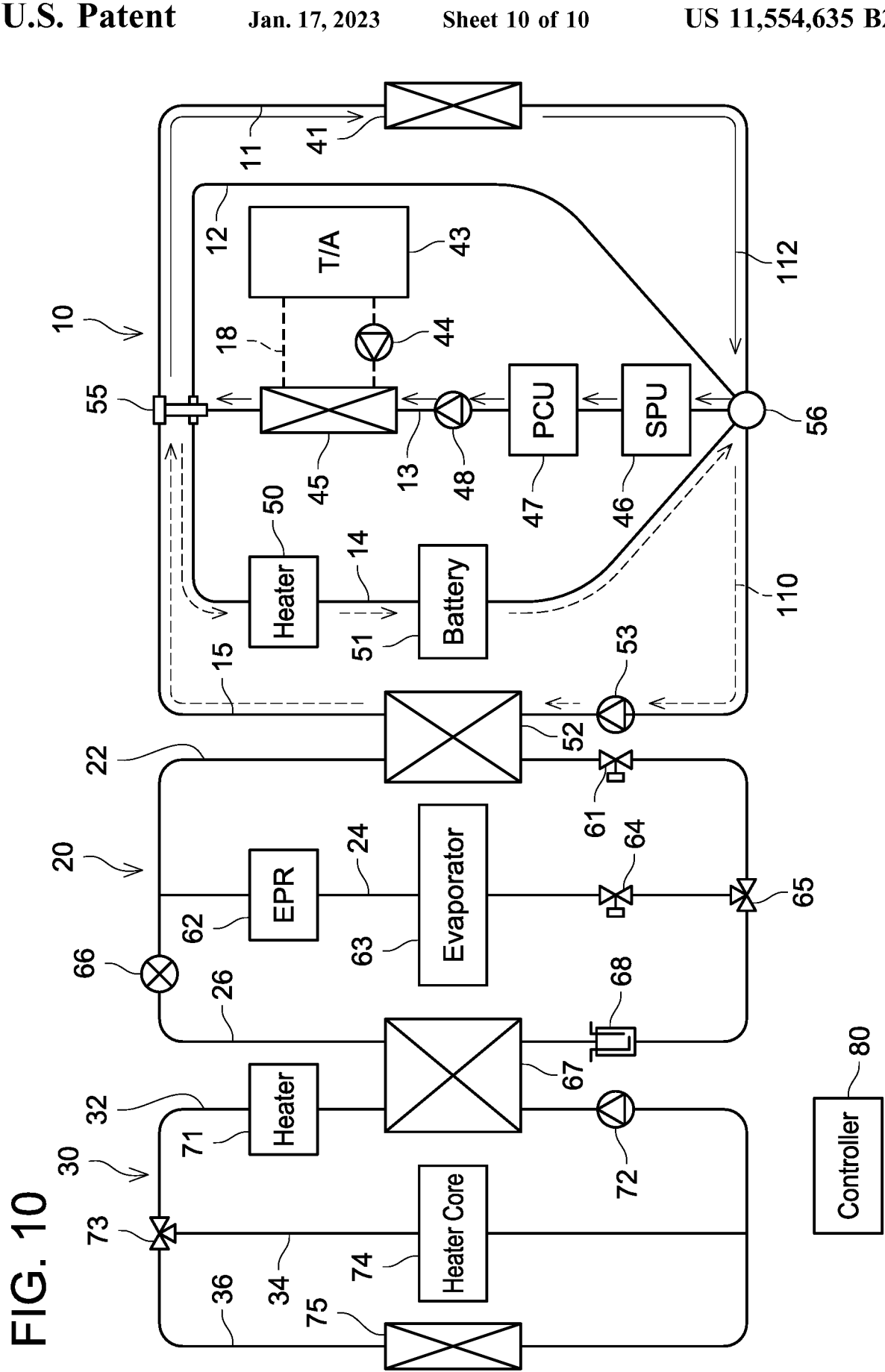
FIG. 10 is a circuit diagram of the heat management device of the variant.

In the above-described embodiment, the channels in the first heat circuit 10 is switched by the two three-way valves 42, 49. However, as in a variant shown in FIGS. 9 and 10, the first heat circuit 10 may include one five-way valve 55 in place of the three-way valves 42, 49, and the five-way valve 55 may switch the channels. In FIGS. 9 and 10, the upstream end of the low-temperature radiator passage 11, the upstream end of the bypass passage 12, the downstream end of the electrical apparatus passage 13, the upstream end of the battery passage 14, and the downstream end of the chiller passage 15 are connected to the five-way valve 55. The downstream end of the low-temperature radiator passage 11, the downstream end of the bypass passage 12, the upstream end of the electrical apparatus passage 13, the downstream end of the battery passage 14, and the upstream end of the chiller passage 15 are connected with each other via a reservoir tank 56. As shown in FIG. 9, when the pump 53 operates while the five-way valve 55 is controlled so that the heat medium flows from the chiller passage 15 to the low-temperature radiator passage 11, the heat medium circulates in the circulation channel 106. Moreover, when the pump 48 operates while the five-way valve 55 is controlled so that the heat medium flows from the electrical apparatus passage 13 to the bypass passage 12, the heat medium circulates in the circulation channel 108 configured with the electrical apparatus passage 13 and the bypass passage 12. In FIG. 9, the circulation channel 106 and the circulation channel 108 are separated. The five-way valve 55 is configured to circulate the heat medium simultaneously in the circulation channel 106 and the circulation channel 108. As shown in FIG. 10, when the pump 53 operates while the five-way valve 55 is controlled so that the heat medium flows from the chiller passage 15 to the battery passage 14, the heat medium circulates in the circulation channel 110. As shown in FIG. 10, when the pump 48 operates while the five-way valve 55 is controlled so that the heat medium flows from the electrical apparatus passage 13 to the low-temperature radiator passage 11, the heat medium circulates in the circulation channel 112. In FIG. 10, the circulation channel 110 and the circulation channel 112 are separated. The five-way valve 55 is configured to circulate the heat medium simultaneously in the circulation channel 110 and the circulation channel 112. As such, substantially like the heat management device 100 of FIG. 1, the heat management device of FIGS. 9 and 10 can also switch the circulation channels in which the heat medium circulates in the first heat circuit 10.

Correspondence between components of the above-described embodiment and components recited in the claims will be described below. The first heat circuit 10 of the embodiment is an example of "heat circuit" of the claims. The heater core 74 of the embodiment is an example of "air-heating apparatus" of the claims. The SPU 46, the PCU 47, and the motor built in the transaxle 43 of the embodiment are examples of "electrical apparatus" of the claims. The low-temperature radiator 41 of the embodiment is an example of "radiator" of the claims. The chiller passage 15 of the embodiment is an example of "air-heating passage" of the claims. The three-way valves 42, 49 of the embodiment are examples of "at least one control valve" of the claims. The five-way valve 55 of the variant is an example of "at least one control valve" of the claims. The battery 51 and the heater 71 of the embodiment are examples of "heat emitter" of the claims. The second heat circuit 20 of the embodiment is an example of "heat pump" of the claims. The chiller 52 of the embodiment is an example of "first heat exchanger" of the claims. The condenser 67 of the embodiment is an example of "second heat exchanger" of the claims. The third heat circuit 30 of the embodiment is an example of "air-heating heat circuit" of the claims.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A heat management device configured to be mounted on a vehicle, the heat management device comprising:
a heat circuit in which a heat medium circulates, the heat circuit comprising a radiator passage, a bypass passage, an electrical apparatus passage, and an air-heating passage connected with each other;
a radiator configured to exchange heat between the heat medium in the radiator passage and outside air;
electrical apparatus configured to be cooled by the electrical apparatus passage;
air-heating apparatus configured to heat air in a cabin of the vehicle;
at least one control valve configured to change a channel in the heat circuit in which the heat medium flows; and
a controller,
wherein
the controller is configured to execute a first process and then a second process,
the first process is a process to execute a first air-heating operation and a heat storage operation simultaneously,
the second process is a process to execute a defrosting operation,
the controller is configured, in the first air-heating operation, to cause the radiator to heat the heat medium in the radiator passage and cause the air-heating apparatus to heat the air in the cabin of the vehicle using heat of the heat medium in the air-heating passage while circulating the heat medium in a first circulation channel including the radiator passage and the air-heating passage by controlling the at least one control valve,
the controller is configured, in the heat storage operation, to circulate the heat medium in a second circulation channel including the electrical apparatus passage and the bypass passage by controlling the at least one control valve, and
the controller is configured, in the defrosting operation, to circulate the heat medium in a third circulation channel including the electrical apparatus passage and the radiator passage by controlling the at least one control valve.

2. The heat management device of claim 1, wherein the controller is configured to execute the first process and the second process alternately.

3. The heat management device of claim 1, further comprising a heat emitter,
wherein
the second process is a process to execute the defrosting operation and a second air-heating operation simultaneously, and
the controller is configured, in the second air-heating operation, to cause the air-heating apparatus to heat the air in the cabin of the vehicle using the heat emitter as a heat source.

4. The heat management device of claim 3, wherein the heat emitter includes a battery configured to provide power to a motor configured to drive the vehicle.

5. The heat management device of claim 3, wherein the heat emitter includes a heater.

6. The heat management device of claim 1, further comprising a heat pump and an air-heating heat circuit in which a heat medium circulates,
wherein
the heat pump comprises:
a first heat exchanger configured to absorb heat from the heat medium in the air-heating passage; and
a second heat exchanger configured to transfer heat to the heat medium in the air-heating heat circuit, and
the air-heating apparatus is configured to heat the air in the cabin of the vehicle by exchanging heat between the heat medium in the air-heating heat circuit and the air in the cabin of the vehicle in the first air-heating operation.

7. The heat management device of claim 1, wherein the first circulation channel is separated from the second circulation channel.

\* \* \* \* \*